(12) United States Patent
Harter, Jr.

(10) Patent No.: US 6,447,132 B1
(45) Date of Patent: Sep. 10, 2002

(54) DAY/NIGHT HUD BACKLIGHTING SYSTEM

(75) Inventor: Joseph E. Harter, Jr., Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/785,978

(22) Filed: Feb. 20, 2001

(51) Int. Cl.[7] .................................................. G01D 11/28
(52) U.S. Cl. .............................. 362/29; 362/26; 362/27; 362/3; 349/62; 349/64; 349/65; 349/68; 345/7; 345/8; 345/9; 345/102; 345/207
(58) Field of Search ........................... 362/29, 26, 27, 362/3; 349/62, 64, 65, 68; 345/7, 8, 9, 102, 207

(56) References Cited

U.S. PATENT DOCUMENTS

| | | | |
|---|---|---|---|
| 4,831,366 A | | 5/1989 | Iino |
| 4,987,410 A | * | 1/1991 | Berman et al. .............. 340/705 |
| 5,034,732 A | | 7/1991 | Iino |
| 5,128,783 A | * | 7/1992 | Abileah et al. ................ 359/49 |
| 5,142,274 A | * | 8/1992 | Murphy et al. .............. 340/705 |
| 5,143,433 A | * | 9/1992 | Farrell .......................... 362/29 |
| 5,161,041 A | * | 11/1992 | Abileah et al. ................ 359/40 |
| 5,202,950 A | * | 4/1993 | Arego et al. ................. 385/146 |
| 5,211,463 A | * | 5/1993 | Kalmanash ................... 362/26 |
| 5,262,880 A | * | 11/1993 | Abileah ........................ 359/40 |
| 5,414,439 A | | 5/1995 | Groves et al. |
| 5,479,275 A | | 12/1995 | Abileah |
| 5,552,907 A | * | 9/1996 | Yokota et al. ................ 359/49 |
| 5,657,163 A | | 8/1997 | Wu et al. |
| 5,709,463 A | * | 1/1998 | Igram .......................... 362/268 |
| 5,745,045 A | | 4/1998 | Kulba et al. |
| 5,745,863 A | | 4/1998 | Uhlenhop et al. |
| 6,039,451 A | | 3/2000 | Grave |
| 6,111,622 A | * | 8/2000 | Abileah ........................ 349/61 |
| 6,337,721 B1 | * | 1/2002 | Hamagishi et al. ........... 349/15 |

* cited by examiner

Primary Examiner—Sandra O'Shea
Assistant Examiner—Jacob Y. Choi
(74) Attorney, Agent, or Firm—Jimmy L. Funke

(57) ABSTRACT

A head up display (HUD) has multiple light sources of varying intensities for projecting a high quality image under various lighting conditions. The light sources provide illumination through an electronic display (e.g. an AMLCD) in the HUD. A high brightness light source illuminates the electronic display during bright or day light conditions. A low brightness light source illuminates the electronic display during night or low light conditions. Both light sources illuminate the electronic display during intermediate lighting conditions. A light panel conducts and diffuses light from the light sources to illuminate the rear of the electronic display. An optional light mixer reduces uneven lighting of the high brightness light source. In operation, the intensities of the light sources are controlled as a function of ambient lighting conditions to optimise the projected image quality.

35 Claims, 4 Drawing Sheets

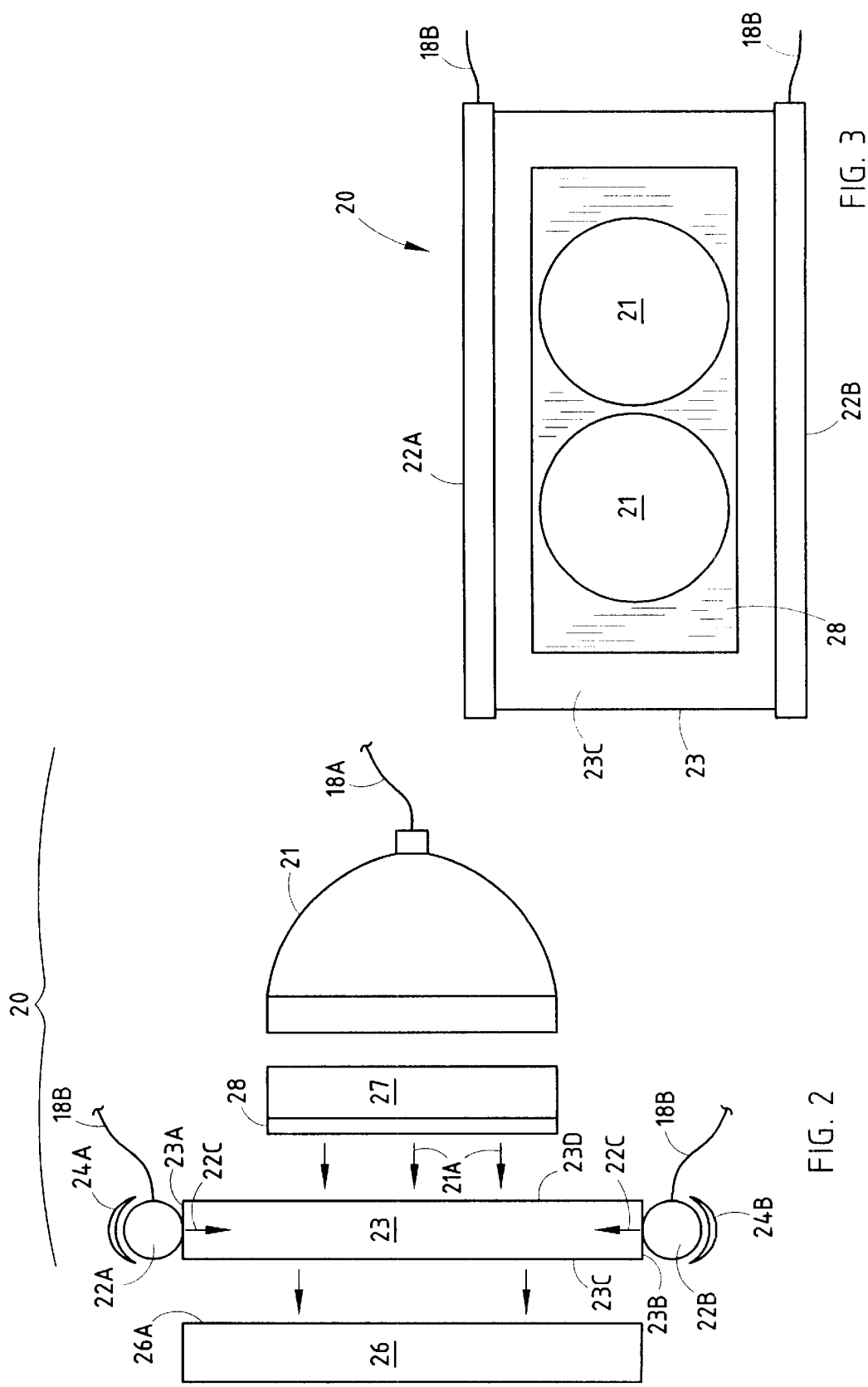

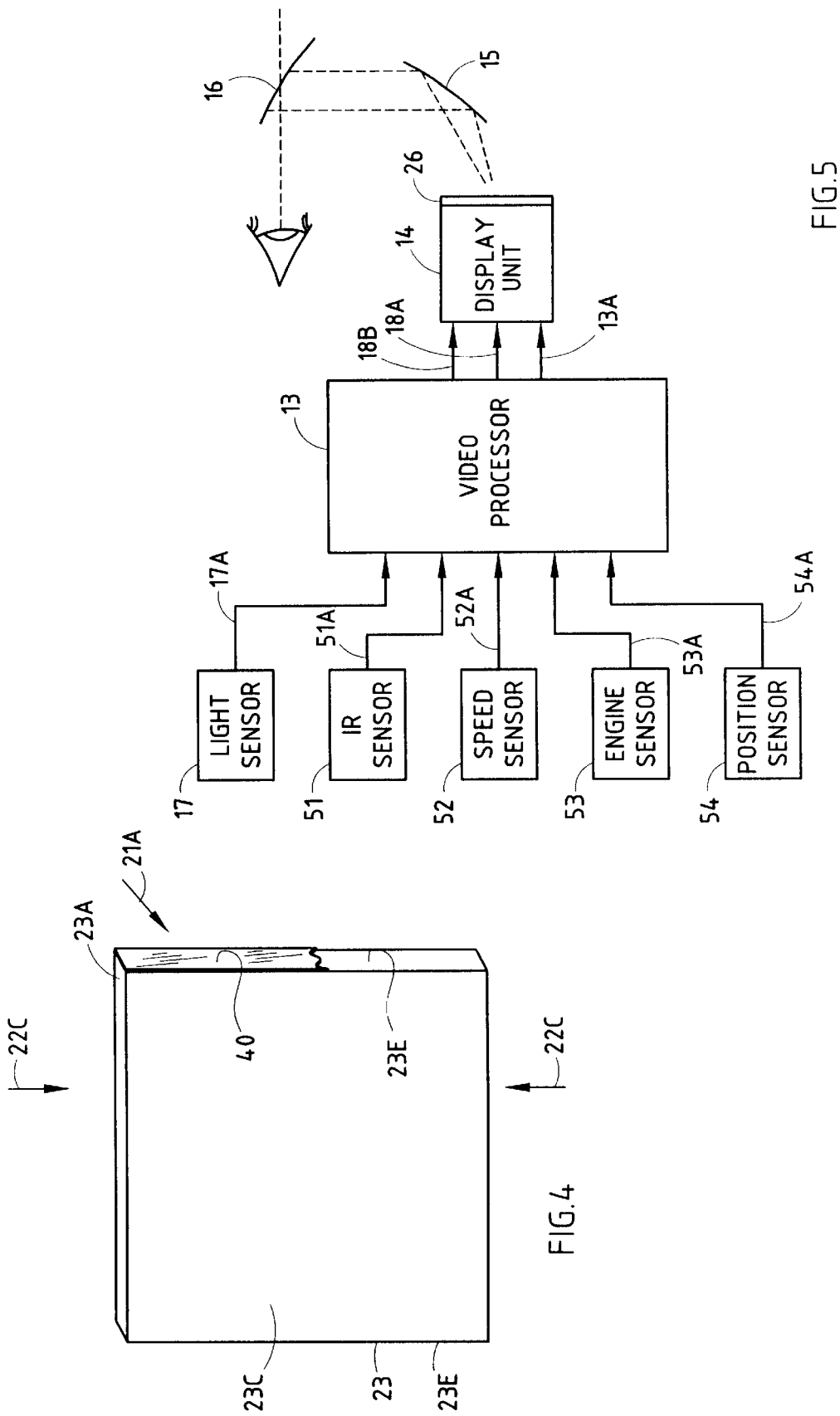

DAY/NIGHT HUD BACKLIGHTING SYSTEM

TECHNICAL FIELD

The present invention generally relates to head up display (HUD) systems and, more particularly, to backlighting for such systems for improved illumination in both daylight and night operation.

BACKGROUND OF THE INVENTION

Head up displays (HUD) are known and are currently used in many military and commercial aircraft. HUDs are also finding application in automobiles. Conventionally a HUD unit is mounted in the automobile to project an image in front of the driver. Adapting HUD units for use in automobiles necessitates making the units rugged, reliable, cost effective, and functional in a wide range of environmental conditions.

One problem with HUDs in automobiles is maintaining satisfactory image illumination over a wide range of lighting conditions, for example, daylight and nighttime lighting conditions. Daylight conditions generally require a bright or high intensity light source so that the projected image is visible in the bright light environment. Conversely, nighttime or low light conditions require low brightness or dim light to project an appropriately illuminated image that provides a safe and comfortable viewing experience for an operator.

Conventional HUD units have attempted to address this problem by using a high brightness light source and simply dimming the light source as needed. However, proper illumination in all light conditions may require dimming ratios of 1000:1 or more. This is difficult to achieve since high brightness light sources typically do not function well over such a wide lighting range. Several problems may occur as a high brightness light source is dimmed to low illumination. Such problems include reducing the lifetime of the light source, color shift (e.g. changes from white to yellow), and uneven illumination or bright spots.

Accordingly, it is therefore desirable to provide for a HUD that has improved operation in both daytime and nighttime conditions. It is also desirable to provide a HUD system design that preserves the lifetime of the light source. It is further desirable to improve the light color for a HUD operating in low light conditions. Yet, it is further desirable to reduce the effect of uneven lighting or bright spots generated in low light conditions.

SUMMARY OF THE INVENTION

The present invention provides for a head up display (HUD) having multiple light sources of varying intensities for improving the projected image under a wide range of ambient lighting conditions. A high brightness light source illuminates a HUD active matrix liquid crystal display (AMLCD) during bright or daylight conditions. A light panel is interposed between the high brightness light source and the AMLCD and diffuses the high brightness light before it illuminates the rear of the AMLCD. A low brightness light source illuminates an edge of the light panel during low light and nighttime conditions. The light panel diffuses the low brightness light and reflects the light out of the front of the light panel to illuminate the rear of the AMLCD. Light from both the high and low brightness light sources are mixed by the light panel and illuminate the AMLCD during intermediate ambient lighting conditions. The light sources are continuously dimmed or brightened responsive to changes in ambient lighting conditions to provide an improved projected image. An optional light mixer, adjacent to the high brightness light source, also mixes the high brightness light thereby further reducing uneven lighting and light spots.

The high brightness light source may be any of a variety of bright light sources including, but not limited to, halogen lamps, bright LEDs, arc lamps, and fluorescent lamps. Preferably, the high brightness light source is sufficiently bright to project a good quality image on the windshield or combiner during bright daylight conditions and is capable of being dimmed for use in intermediate lighting conditions.

The low brightness light source also illuminates the rear of the AMLCD via the light panel. However, the low brightness light source is preferably located to the side of the light panel and illuminates the edge of the panel. The light panel reflects and diffuses the light from the low brightness light source and illuminates the rear of the AMLCD. The low brightness light source is any of a variety of light sources including, but not limited to, fluorescent lamps and LEDs. The low brightness light source preferably generates good quality light in low light conditions and is capable of being intensified to generate satisfactory light in intermediate lighting conditions.

According to more specific aspects of the present invention, the light panel is light transmissive and allows light from the high brightness light source to pass through and illuminate the rear of the AMLCD. Similarly, the panel reflects light from the low brightness source to the rear of the AMLCD. The light panel is preferably made of acrylic material, includes reflective edges, and at least one textured surface. The reflective edges reflect light back into the panel thereby increasing brightness. The textured surface, preferably on the front (nearest the AMLCD), diffuses the light from both sources for even light distribution.

The invention also includes a light mixer for mixing the light from the high brightness light source. High brightness light sources often produce uneven light or light spots as they are dimmed to low light levels. The preferred embodiment uses a square light mixer that reduces the effects of the uneven light and/or the light spots.

The intensity of the light sources is controlled responsive to ambient light conditions. A light sensor senses ambient light conditions and communicates a light signal representative thereof to a controller. The controller analyzes the light signal and controls the intensity of the light sources for optimum projected image illumination. Brightness of the lights is also adjustable by an operator. The operating ranges of the light sources overlap for improved lighting quality and so that transition between the light sources is smooth and transparent to a viewer. The light sources are controlled as follows. The high brightness light source is active for daylight conditions. As ambient light conditions dim, the high brightness light source is also dimmed. The low brightness light source is activated during intermediate ambient light conditions. Light from the low brightness light source mixes with light from the high brightness light source to reduce color shift (i.e. color temperature light) problems. As ambient light conditions dim further, the high brightness light source is turned off. In low light conditions only the low brightness light source is active, and is dimmed or brightened responsive to changes in ambient light conditions.

The design of the present invention advantageously reduces the problems of the prior art to provide an improved daylight and low light HUD. First, mixing light from multiple sources solves the color temperature light problem. Second, light from both sources mix to reduce uneven lighting or light spots. Third, the lifetime of the high brightness light source is preserved since it need not be dimmed to very low brightness levels.

It is envisioned that multiple high brightness and low brightness light sources may be used. Further, light sources of various light intensities may be used. For example, a high brightness light source may be combined with an intermediate brightness light source and a low brightness light source.

These and other features, advantages, and objects of the present invention will be further understood and appreciated by those skilled in the art by reference to the following specification, claims, and appended drawings.

BRIEF DESCRIPTION OF THE DRAWINGS

The present invention will now be described, by way of example, with reference to the accompanying drawings, in which:

FIG. 2 is a side view of the backlighting system of the invention.

FIG. 3 is a front view of the backlightning system of the invention.

FIG. 4 is a perspective view of a light panel/light pipe.

FIG. 5 is a block diagram of a HUD system.

DESCRIPTION OF THE PREFERRED EMBODIMENT

Figure 1:
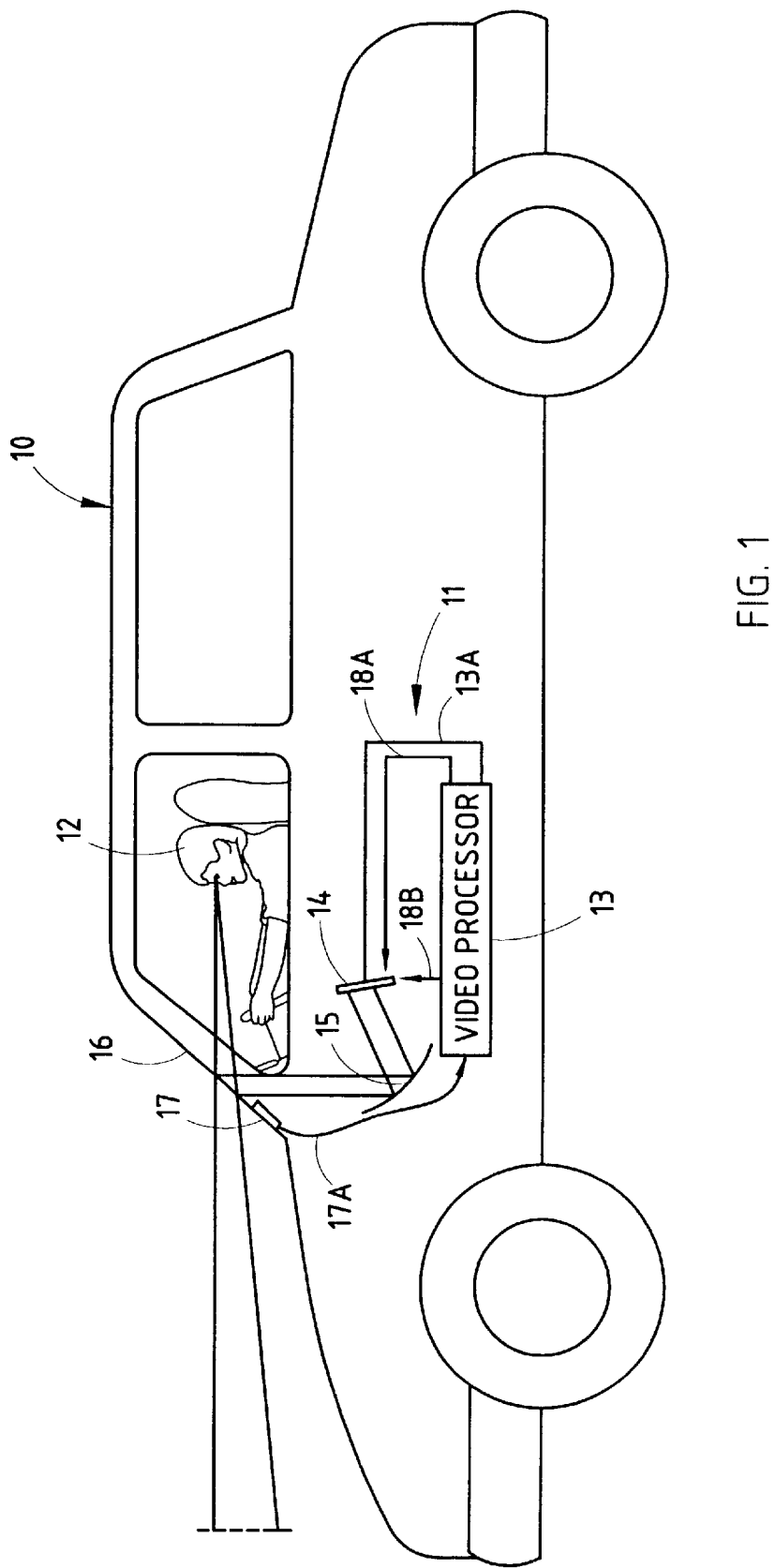
FIG. 1 is a schematic diagram of a HUD system in an automobile.

Turning to FIG. 1, an automobile 10 is shown equipped with a head up display system (HUD) 11. HUD 11 communicates information to the vehicle operator 12 via an image projected in front of the operator and preferably within the operator's visual line of sight. The HUD 11 allows the operator to receive information without taking his eyes off of the road.

HUD 11 includes a video processor 13, display unit (i.e., an image source) 14, mirror 15, and combiner or windshield 16. Video processor 13 receives data from multiple systems and sensors in automobile 10 and formats the data into a suitable display signal 13A that is communicated to display unit 14. For example, data may be received from an infrared sensor for detecting objects in the roadway ahead of the vehicle, vehicle speed sensors, engine sensors, light sensors, and GPS position related data to name a few. Video processor 13 is of conventional design and therefore is not described herein in detail. The preferred embodiment uses a digital microprocessor, memory, and related circuitry to implement the video processor 13.

Processor 13 receives light signal 17A from light sensor 17. Light signal 17A is representative of ambient light conditions. Processor 13 generates multiple signals responsive to light signal 17A for controlling the brightness of the backlight light sources that are part of display unit 14 and are described below. One signal, the high brightness signal 18A, controls the high brightness light source. A second signal, the low brightness signal 18B, controls the low brightness light source. It should be appreciated by those skilled in the art that alternate, yet equivalent, embodiments are possible. For example, a light signal from the light sensor could be communicated directly to the light sources or to a dedicated brightness controller for controlling the brightness of the light sources.

Display unit 14 generates and projects the desired image. Display unit 14 may be of conventional design except for the backlight system that is the focus of this specification. Display unit 14 includes an electronic display and a backlight system that is described below. Responsive to display signal 13A, symbology is formed on the screen of the electronic display. The electronic display is illuminated and an image is projected onto a combiner or windshield 16 via mirror 15.

Referring to FIG. 2, a side view of the backlight system and display of the current invention is illustrated therein. Backlight 20 includes high brightness light sources 21, low brightness light sources 22A and 22B, light panel 23, and reflectors 24A and 24B.

High brightness light sources 21 are controlled by processor 13 via high brightness signal 18A. High brightness light sources 21 preferably include one or more halogen bulbs that produce bright light 21A. During daylight conditions only the high brightness light sources 21 are used to illuminate electronic display 26. Processor 13 continuously monitors ambient light conditions via light signal 17A. When ambient light conditions change, processor 13 controls high brightness light sources 21 to either dim or brighten responsive to the changing conditions. When ambient light conditions reach a predetermined low level, the high brightness light sources 21 are turned off, thus preserving their lifetime. The low brightness light sources 22A and 22B are activated to provide illumination when the high brightness light sources are turned off. High brightness light sources 21 preferably operate over the range of about 31,000 footlamberts (fl) to 310,000 fl.

Bright light 21A is transmitted through panel 23 where it is diffused prior to exiting light panel 23 and illuminating the rear of electronic display 26. When both the high brightness light source 21 and low brightness light sources 22A and 22B are active, bright light 21A is mixed with dim light 22C in panel 23.

Similarly, low brightness light sources 22A and 22B are controlled by processor 13 via low brightness signal 18B. Low brightness light sources 22A and 22B preferably include one or more fluorescent lights suitable for producing low brightness light. During low light or nighttime conditions only the low brightness light sources 22A and 22B are turned on. Processor 13 continuously monitors ambient light signal 17A. When ambient light conditions change, processor 13 controls the low brightness light sources 22A and 22B via low brightness signal 18B to either dim or brighten the light. When ambient light conditions reach a predetermined level, low brightness light sources 22A and 22B are turned off since they are no longer needed in bright light conditions. The predetermined light levels for turning light sources on and off are variable depending on a particular implementation. For example, the characteristics of the particular light sources used will affect the selection of the light levels.

Dim light 22C from low brightness light sources 22A and 22B illuminate edges 23A and 23B of light panel 23 where it is reflected, mixed with bright light 21A, and diffused before exiting light panel 23 to illuminate the rear of display 26. Low brightness light sources 22A an 22B preferably operate over the range of about 310 fl to 3,100 fl.

Light panel 23 conducts light from all light sources to illuminate the electronic display. Also known as a light pipe, light panel 23 is made of a light transmissive material, preferably acrylic, and reflects and mixes light. Bright light 21A enters the backside 23D of light panel 23 and exits the front side 23C to illuminate the rear 26A of display 26. The front side 23C of light panel 23 is textured to diffuse light and provide uniform illumination of display 26. The backside 23D of light panel 23 may also be textured, if desired, to further diffuse bright light 21A. Low brightness light sources 22A and 22B illuminate edges 23A and 23B of light panel 23. Edges 23E that are not illuminated have a reflective coating (not shown here) to reflect light back into panel 23 and thereby reduce light loss. The reflective coating may include any conventional reflective coating such as an aluminised coating, reflective foil, white paint, or the like.

Light mixer 27 is of conventional design. Its purpose is to eliminate uneven lighting or bright spots that occur when the high brightness light source is dimmed to low light levels. Mixer 27 is square and has reflective inner surfaces. Alternate shapes may also be used. Mixer 27 is optional since light panel 23 also functions to perform some mixing and diffusing of uneven lighting. Mixer 27 may be added to the backlighting system if uneven lighting or bright spots are a problem.

Display 26 may include a conventional backlit electronic display. The preferred embodiment of display 26 uses an active matrix liquid crystal display (AMLCD), however; alternate displays may be used. For example, many LCDs may be used and may include either monochrome or color.

FIG. 3 illustrates the front view of the backlighting system. Shown in FIG. 3 are high brightness light sources 21, low brightness light sources 22A and 22B, light panel 23, and mask 28. In the embodiment shown, two high brightness light sources 21 illuminate the center portion of light panel 23. Mask 28 reflects light back into light panel 23. High brightness light sources 21 illuminate a smaller portion of light panel 23 because a smaller field of view is used for daylight conditions. Low brightness light sources 22A and 22B illuminate the entire light panel 23 thereby providing a wider field of view for nighttime operations.

Referring to FIG. 4, the light panel/light pipe 23 is shown. Light panel 23 is shown as a rectangular panel of light transmissive material. Dim light 22C enters from the top edge 23A and the bottom edge 23B. Bright light 21A enters from the backside 23D of the panel 23. Light from all sources is mixed in light panel 23 and exits front side 23C of light panel 23. Front side 23C is textured to diffuse light exiting light panel 23. The texturing preferably comprises pyramid diffusion shapes or the like. Side edges 23E are coated with a reflective material 40 to reflect light back into light panel 23.

A HUD system that may employ the backlighting system of the present invention is shown in FIG. 5. Video processor 13 receives inputs from various sensors and systems throughout the vehicle 10. Light sensor 17 measures ambient light conditions and communicates light signal 17A to processor 13. IR sensor 51 detects objects in the road ahead of the vehicle and communicates IR signal 51A to processor 13. Speed sensor 52 senses vehicle velocity and communicates speed signal 52A to processor 13. Similarly, engine sensors 53 sense and measure various engine related parameters and generates an engine signal 53A. Position sensors 54 include sensors such as GPS, compass, acceleration, and gyros. Position sensors 54 generate position signal 54A.

Video processor 13 analyzes the various input signals and data and generates a display signal 13A that commands electronic display 26 to display desired symbology. Video processor 13 also controls the brightness of the high brightness light source 21 via high brightness signal 18A and the low brightness light source 22A and 22B via low brightness signal 18B.

Figure 6:
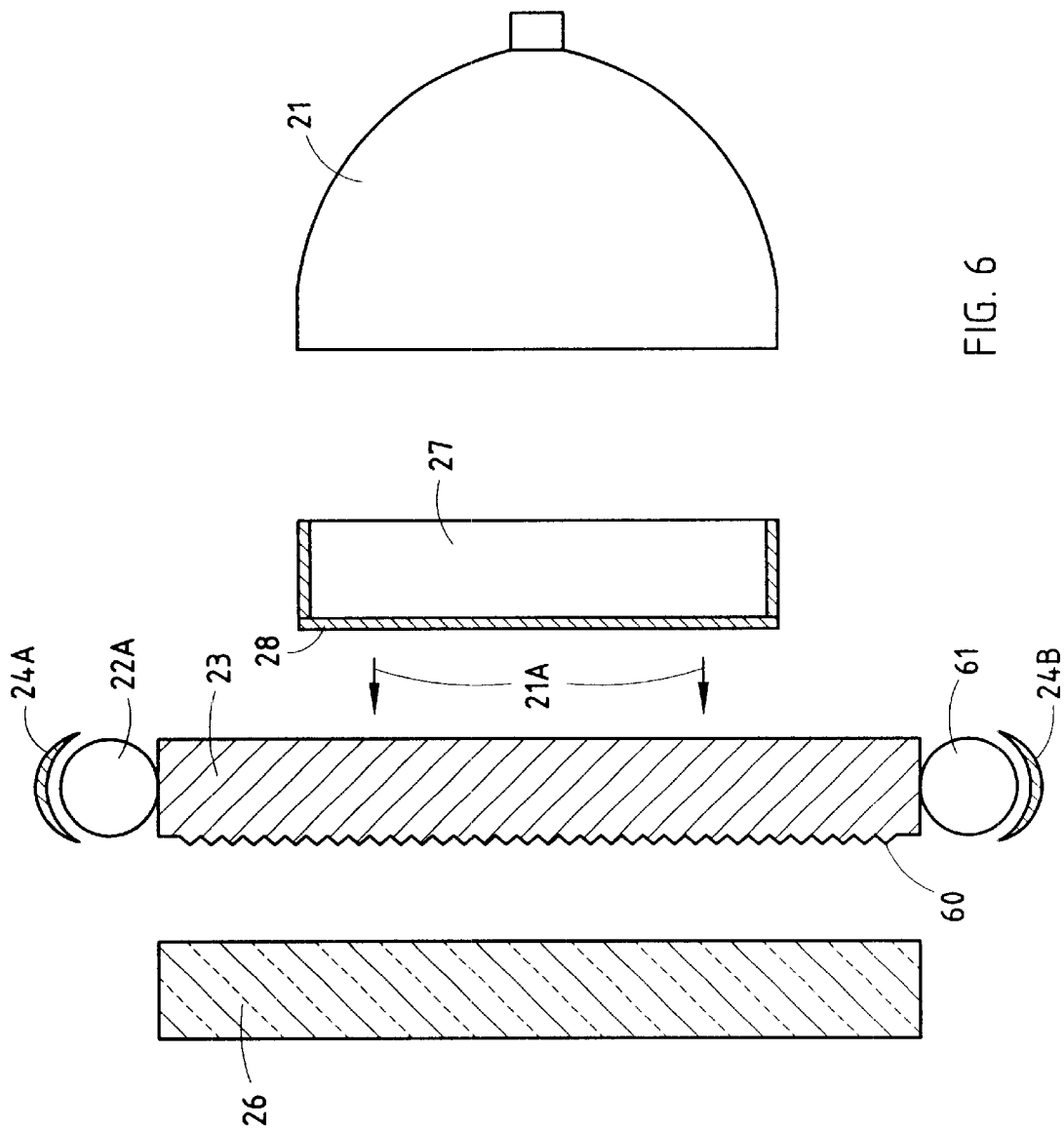
FIG. 6 is cross sectional view taken through the backlighting system further showing an intermediate brightness light source according to one embodiment.

Referring to FIG. 6, an intermediate brightness light source embodiment is illustrated. FIG. 6 is similar to FIG. 4; however, low brightness light source 22B in FIG. 4 has been replaced with intermediate light source 61. Light sources of varying brightness help to eliminate color temperature problems, uneven lighting, and extend the lifetime of light sources since they are not dimmed and brightened over wide ranges.

In this embodiment the three different light sources are turned on and off and are brightened or dimmed responsive to ambient light conditions. The high brightness light source is used primarily for bright ambient light conditions, the intermediate brightness light source is used for intermediate ambient light conditions, and the low brightness light source is used primarily for low ambient light conditions. Two of the light sources are active simultaneously as the ambient light condition transitions between the predetermined boundaries. This prowess is further described below.

Beginning in bright ambient light conditions, the high brightness light source 21 is used exclusively. As ambient light conditions become less bright, the high brightness light source 21 is dimmed. When ambient light conditions reach a predetermined level, intermediate brightness light source 61 is turned on. As ambient light conditions dim further, the high brightness light source 21 is dimmed. When ambient light conditions reach another predetermined level, the high brightness light source is turned off. As ambient light conditions dim to yet another predetermined level, the low brightness light source 22A is turned on. The intermediate brightness light source 61 is dimmed further responsive to ambient light conditions until the intermediate brightness light source is turned off. In low ambient light conditions the low brightness light source is used exclusively.

Also illustrated in FIG. 6 is textured surface 60 on the front of light panel 23. Textured surface 60 diffuses light from all of the light sources for even lighting of electronic display 26.

The method of the invention follows from the previous description. The steps for backlighting the display include transmitting light from a high brightness light source through a light panel to illuminate the rear of an electronic display, illuminating an edge of the light panel with a low brightness light source, and sensing the ambient lighting conditions. Further steps include controlling the brightness of the light sources responsive to changes in ambient light conditions. The controlling step includes turning the light sources on and off and also dimming and brightening the light sources to smoothly transition through varying ambient lighting conditions. Yet another step is illuminating the light panel with an intermediate brightness light source.

The head up display 11 of the present invention achieves dimming ratios exceeding 1000:1 while maintaining excellent light quality and is particularly useful in HUD systems, especially those employed on automobiles. The system achieves improved performance and improved light source lifetimes.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

I claim:

1. A head up display system, comprising:
    an AMLCD for displaying an image;
    a high brightness light source positioned for illuminating the AMLCD;
    a light transmissive panel positioned between the AMLCD and the high brightness light source, the light transmissive panel transmitting light travelling from the high brightness light source to the AMLCD; and
    a low brightness light source positioned for illuminating the light transmissive panel, wherein the high brightness light source is active during bright light conditions and the low brightness light source is active during low light conditions, and wherein both the low and high brightness light sources are active during certain intermediate ambient light conditions which occur between daylight and nighttime conditions.

2. The head up display system according to claim 1, wherein the low brightness light source illuminates an edge of the light transmissive panel.

3. The head up display system according to claim 1, further comprising:
    a light mixer for mixing light from the high brightness light source, wherein the lightmixer is positioned between the high brightness light source and the light transmissive panel.

4. The head up display system according to claim 1, wherein the light transmissive panel is acrylic material.

5. The head up display system according to claim 4, wherein said light transmissive panel comprises a block of acrylic material.

6. The head up display system according to claim 2, wherein the light transmissive panel includes a reflective portion on a first edge portion of the panel, and wherein the low brightness light source illuminates a second edge portion of the transmissive panel.

7. The head up display system according to claim 1, wherein the transmissive panel includes a textured surface for diffusing light from the high brightness light source.

8. The head up display system according to claim 1, further comprising:
    a reflector positioned adjacent the low lightness light source for reflecting light from the low brightness light source to the transmissive panel.

9. The head up display system according to claim 1, wherein the high brightness light source is a plurality of light emitting devices.

10. The head up display system according to claim 1, wherein the high brightness light source is at least one halogen bulb.

11. The head up display system according to claim 1, wherein the low brightness light source is at least one fluorescent bulb.

12. The head up display system according to claim 1, wherein the high brightness light source is at least one light emitting diode.

13. A head up display system, comprising:
    an AMLCD for displaying an image;
    a high brightness light source positioned for illuminating the AMLCD;
    a light transmissive panel positioned between the AMLCD and the high brightness light source, the light transmissive panel transmitting light travelling from the high brightness light source to the AML CD; and
    a low brightness light source positioned for illuminating the light transmissive panel, wherein the high brightness light source is active during bright light conditions and the low brightness light source is active during low light conditions; and
    an intermediate brightness light source positioned for illuminating the light panel, wherein the intermediate brightness light source has a brightness that is between the brightness of the high and low brightness light sources.

14. The head up display system according to claim 13, wherein the intermediate brightness light source illuminates an edge of the light panel.

15. The head up display system according to claim 1, wherein the high brightness light source generates luminance of about 310,000 fl.

16. The head up display system according to claim 15 wherein the high brightness light source is operable in the range of about 31,000 fl to about 310,000 fl.

17. The head up display system according to claim 1, wherein the low brightness light source generates luminance of about 310 fl.

18. The head up display system according to claim 17 wherein the low brightness light source is operable in the range of about 310 fl to about 3,100 fl.

19. A backlight system for a HUD having an electronic display for displaying an image, said backlight system comprising:
    at least one high brightness light source positioned for illuminating the electronic display;
    a light transmissive panel interposed between the electronic display and the high brightness light source; and
    at least one low brightness light source positioned for illuminating the transmissive panel, wherein the high brightness light source illuminates the display in bright light conditions and the low brightness light source illuminates the display in low light conditions, and wherein both the low and high brightness light sources are active during certain intermediate ambient light conditions which occur between daylight and nighttime conditions.

20. The backlight system according to claim 19, wherein the at least one one low brightness light source illuminates an edge of the light transmissive panel.

21. The backlight system according to claim 19 further comprising a light mixer for mixing light from the high brightness light source, wherein the light mixer is positioned between the high brightness light source and the light transmissive panel.

22. The backlight system according to claim 19 further comprising a reflective member positioned adjacent the low brightness light source such that light from the low brightness light source is reflected toward the transmissive panel.

23. The backlight system according to claim 19 further comprising reflective material adjacent an edge of the transmissive panel for reflecting light from the panel back into the panel.

24. The backlight system according to claim 19 wherein the transmissive panel is a light diffuser.

25. The backlight system according to claim 24 wherein the transmissive panel includes a textured surface for diffusing light.

26. The backlight system according to claim 19 wherein the high brightness light source has at least one halogen bulb.

27. The backlight system according to claim 19 wherein the low brightness light source has at least one fluorescent bulb.

28. The backlight system according to claim 19 wherein the light transmissive panel is made of acrylic material.

29. A backlight system for a HUD having an electronic display for displaying an image, said backlight system comprising:
- at least one high brightness light source positioned for illuminating the electronic display;
- a light transmissive-panel interposed between the electronic display and the high brightness light source;
- at least one low brightness light source positioned for illuminating the transmissive panel, wherein the high brightness light source illuminates the display in bright light conditions and the low brightness light source illuminates the display in low light conditions; and
- an intermediate brightness light source positioned for illuminating the light transmissive panel, wherein the intermediate brightness light source has a brightness that is between the brightness of the high and low brightness light sources.

30. The backlight system according to claim 29 wherein the intermediate brightness light source illuminates an edge of the light transmissive panel.

31. A method of backlighting an electronic display for operation in both bright light conditions and low light conditions, comprising the steps of:
- transmitting light from a high brightness light source through a light panel to illuminate the electronic display;
- illuminating the edge of the light panel with a low brightness light source to illuminate the electronic display;
- sensing ambient light conditions; and
- controlling the brightness of both the high brightness light source and the low brightness light sources responsive to ambient light conditions, wherein both the low and high brightness light sources are active during certain intermediate ambient light conditions which occur between daylight and nighttime conditions.

32. The method of backlighting an electronic display according to claim 31 wherein the step of controlling includes dimming the high brightness light source responsive to dimming ambient light conditions.

33. The method of backlighting an electronic display according to claim 31 wherein the step of controlling includes dimming the low brightness light sources responsive to dimming ambient light conditions.

34. A method of backlighting an electronic display for operation in both bright light conditions and low light conditions, comprising the steps of:
- transmitting light from a high brightness light source through a light panel to illuminate the electronic display;
- illuminating the edge of the light panel with a low brightness light source to illuminate the electronic display;
- sensing ambient light conditions;
- controlling the brightness of both the high brightness light source and the low brightness light sources responsive to ambient light conditions, wherein the step of controlling includes activating both the high brightness light source and the low brightness light source simultaneously to improve the color of light produced.

35. The method of backlighting an electronic display according to claim 31, further comprising a step of mixing light exiting from the high brightness light source.

* * * * *